(No Model.)

A. C. VAUGHAN.
NUT LOCK.

No. 312,677. Patented Feb. 24, 1885.

WITNESSES:
W. W. Hollingsworth
Edw. W. Byrn

INVENTOR:
Aaron C. Vaughan
BY Munn & Co.
ATTORNEYS.

UNITED STATES PATENT OFFICE.

AARON C. VAUGHAN, OF SHANE'S CROSSING, OHIO.

NUT-LOCK.

SPECIFICATION forming part of Letters Patent No. 312,677, dated February 24, 1885.

Application filed May 14, 1884. (No model.)

*To all whom it may concern:*

Be it known that I, AARON C. VAUGHAN, of Shane's Crossing, in the county of Mercer and State of Ohio, have invented certain new and useful Improvements in Nut-Locks; and I do hereby declare that the following is a full, clear, and exact description of the same, reference being had to the accompanying drawings, and to the letters of reference marked thereon, in which—

Figure 1:
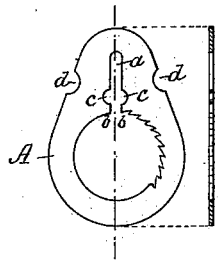
Figure 2:
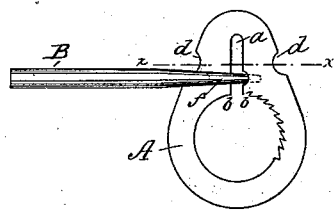
Figure 3:
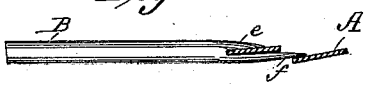
Figure 4:
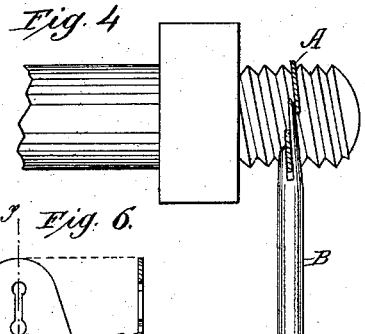
Figure 6:
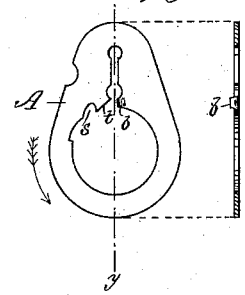
Figure 5:
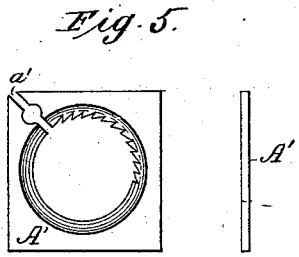
Figure 7:
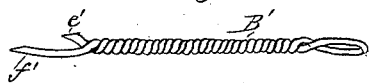

Figure 1 is a face view, with a longitudinal section projected therefrom, of the locking-plate. Fig. 2 is a face view of the plate, showing the position of the key in twisting the plate into a spiral. Fig. 3 is a view of Fig. 2 in section through the line $x\ x$ and looking down. Fig. 4 is a view of the same parts shown in Fig. 3, showing the application of the same to the nut and bolt. Fig. 5 is a face and edge view of a modified form of the locking-plate. Fig. 6 is a face view and longitudinal section of a further modification of the plate; and Fig. 7 is a modified form of the key.

My invention relates to that form of nut-lock which permits of the utilization of the usual construction of nut and screw-bolt without alteration of or injury to the same, and which nut-lock is in the nature of a washer or thin plate acting somewhat after the manner of a jam-nut.

My invention consists in a thin spring-plate having a circular perforation of a diameter equal to that of the screw-bolt, and whose inner peripheral edge lies in a single plane, but has a slot or notch that permits the peripheral edge of said perforation to be sprung into a spiral or helical position when put on the screw-bolt, and then when turned up to the nut and its tension is allowed to assert itself, said peripheral edge, in tending to resume its normal plane, binds the thread of the bolt with a friction that holds said plate and nut firmly against turning off.

In the drawings, Figs. 1, 2, 3, and 4, A represents the thin flat plate, made of steel, and having a hole through it of a size equal in diameter to that of the bolt at the bottom of its threads, so as to hug the bolt between the threads. This plate has a slot, $a$, leading from the central aperture, which permits the two terminal edges, $b\ b$, of the plate to be sprung into different planes, which throws said inner periphery of the plate into a spiral or twist that corresponds to the pitch of the thread of the screw-bolt, and in which position the plate is turned on the screw-bolt, (by the aid of a key hereinafter described,) and when said plate rests flat against the nut, the plate is allowed to exert its lateral tension against the thread between its edges, in which position the plate cramps and binds, so as to hold tightly by partially burying its edges $b\ b$ into the threads and acts as a check-nut to keep the nut from turning off. On one side of the slot $a$ for some distance the inner periphery of the plate A is notched with saw-teeth serrations, which enable the plate to grasp the threads with a more positive effect.

In the sides of the metal of the plate forming the slot $a$ are formed two opposite notches, $c\ c$, and on the outside of the eccentric portion of the plate surrounding slot $a$ are formed also notches $d\ d$. These notches $c$ and $d$ are designed to accommodate a key, B, for the purpose of throwing the normally flat spring-plate into a spiral. The key B is made with two prongs, $e$ and $f$, one of which, $e$, is a short one and the other, $f$, a long one. This long one is forced in between the notches $c\ c$ at right angles to the plate, and the key is then swung over to one side nearly parallel with the plate, as in Figs. 3 and 4, and this twists the inner periphery of the plate into a spiral. Then the short prong $e$ drops into one of the notches $d$, and by a slight movement of the key in the plane of the plate a portion of the plate on one side of the notch $d$ passes up between the prongs $e$ and $f$, (see Figs. 3 and 4,) and holds the key and plate rigidly fastened together in this position. In this position the plate is turned up to place on the bolt against the nut, as in Fig. 4, and the key is then withdrawn, when the plate tightly clamps the bolt by a sidewise stress against the threads in endeavoring to regain its normal flat position. To remove the plate, the key is readjusted and the plate turned off.

In Fig. 5 is shown a plate, A', of modified construction, in which there is no special offsetting or eccentric portion to the plate; but the latter is made square and a slot, $a'$, is cut entirely through the plate from the central aperture. In this case the same construction of a flat spring-plate and the same principle of its application are employed. I make in this case the outer face of the plate beveled to a sharp edge at the central aperture.

B' is a modified construction of the key which I may use. This is made of twisted wire with one long end, $f'$, and one short end, $e'$.

I am aware of the fact that a check-plate whose inner periphery is normally spiral and provided with a notch is not new, and I do not claim this, but only a spring-plate with a perforation through it whose inner periphery is normally in the same plane, but slotted to assume the spiral form when being applied.

In Fig. 6 I show a still further modification of the flat check-plate A. In this case the terminal edge, $b$, on the right is slightly canted down or in toward the nut, and the other edge has a space, $s$, cut away, which forms a tooth, $t$. Now, when the inner periphery of the plate is sprung into a spiral, this tooth $t$ rests upon one side of the thread and the canted edge on the other side of the slot rests upon the other side of the thread, and the result is that any tendency to turn the plate off the bolt, as in the direction of the arrow, results in the burying of this tooth and canted edge into the thread, which effectually prevents the nut from coming off.

Having thus described my invention, what I claim, and desire to secure by Letters Patent, is—

1. A check-plate made of thin springing metal with a central bolt-opening and a slot leading therefrom, the inner periphery of which plate is made thin enough to lie between the threads of the bolt and normally occupies a single flat plane, but is adapted to be twisted into a spiral to conform to the wind of the bolt-thread and bind thereagainst, as described.

2. The spring check-plate A, having a central opening with its inner periphery in the same plane, and a slot, $a$, with notches $c$ and $d$, as and for the purpose described.

3. A check-plate made of thin springing metal with a central bolt-hole and a slot leading therefrom, the inner periphery of which plate is made thin enough to lie between the bolt-threads and is serrated, as shown, and normally occupies a flat or single plane, but is adapted to be twisted to conform to the wind of the bolt-thread and bind thereagainst, as described.

AARON C. VAUGHAN.

Witnesses:
J. S. RILEY,
FRANK VAN WORMER.